US011188227B2

(12) United States Patent
Heo et al.

(10) Patent No.: US 11,188,227 B2
(45) Date of Patent: Nov. 30, 2021

(54) ELECTRONIC DEVICE AND KEY INPUT METHOD THEREFOR

(71) Applicant: Samsung Electronics Co., Ltd., Gyeonggi-do (KR)

(72) Inventors: Jiyoon Heo, Gyeonggi-do (KR); Younghak Oh, Gyeonggi-do (KR); Minjeong Moon, Gyeonggi-do (KR); Minjung Moon, Gyeonggi-do (KR); Myojin Bang, Gyeonggi-do (KR); Seoyoung Yoon, Gyeonggi-do (KR); Jaegi Han, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/689,806

(22) Filed: Nov. 20, 2019

(65) Prior Publication Data

US 2020/0167071 A1    May 28, 2020

(30) Foreign Application Priority Data

Nov. 28, 2018   (KR) .......................... 10-2018-0149474

(51) Int. Cl.
*G06F 3/0489* (2013.01)
*G06F 16/55* (2019.01)
*G06F 3/023* (2006.01)

(52) U.S. Cl.
CPC ........ *G06F 3/04895* (2013.01); *G06F 3/0238* (2013.01); *G06F 16/55* (2019.01)

(58) Field of Classification Search
CPC .... G06F 3/04895; G06F 16/55; G06F 3/0238; G06F 3/04886
See application file for complete search history.

(56) References Cited

U.S. PATENT DOCUMENTS

| 2004/0130859 | A1* | 7/2004 | Helot |
|---|---|---|---|
| 2009/0235165 | A1 | 9/2009 | Fux et al. |
| 2011/0134140 | A1 | 6/2011 | Kang |
| 2011/0179372 | A1 | 7/2011 | Moore et al. |
| 2012/0027305 | A1* | 2/2012 | Kim .................. G06K 9/00664 |
| | | | 382/195 |
| 2013/0198837 | A1 | 8/2013 | Kim |

(Continued)

FOREIGN PATENT DOCUMENTS

| JP | 2013-192111 A | 9/2013 |
|---|---|---|
| JP | 6080934 B9 | 1/2017 |

(Continued)

OTHER PUBLICATIONS

International Search Report dated Feb. 28, 2020 issued in counterpart application No. PCT/KR2019/015823, 8 pages.

*Primary Examiner* — Mark W Regn
(74) *Attorney, Agent, or Firm* — The Farrell Law Firm, P.C.

(57) ABSTRACT

An electronic device and a key input method using an external input device are provided. The electronic device includes a camera; a display; a communication interface; a memory; and a processor. The processor is configured to establish an electrical connection to an external keyboard; obtain an image of the external keyboard; set a key arrangement for the external keyboard based on the obtained image; and generate information corresponding to a key input signal received from the external keyboard based on the set key arrangement.

12 Claims, 15 Drawing Sheets

(56) References Cited

U.S. PATENT DOCUMENTS

| | | | |
|---|---|---|---|
| 2014/0101596 A1 | 4/2014 | Staats et al. | |
| 2016/0188281 A1* | 6/2016 | Luo | G06F 3/1462 345/2.2 |
| 2017/0177215 A1 | 6/2017 | Nomura et al. | |
| 2018/0350150 A1 | 12/2018 | Powderly et al. | |

FOREIGN PATENT DOCUMENTS

| | | | |
|---|---|---|---|
| KR | 10-0942218 B1 | 2/2010 | |
| KR | 10-1497762 | 2/2015 | |
| WO | WO 2007/093984 | 8/2007 | |
| WO | WO-2007093984 A2 * | 8/2007 | G06F 3/011 |

\* cited by examiner

FIG. 5A

| No. | Layout Name |
|---|---|
| 01 | UK English |
| 02 | Belgian |
| 03 | Bulgarian |
| 04 | Brazilian |
| 05 | Canadian-French |
|  | ..... |
| 39 | US-Colemak |
| 40 | US-Dvorak |
|  | ..... |

500

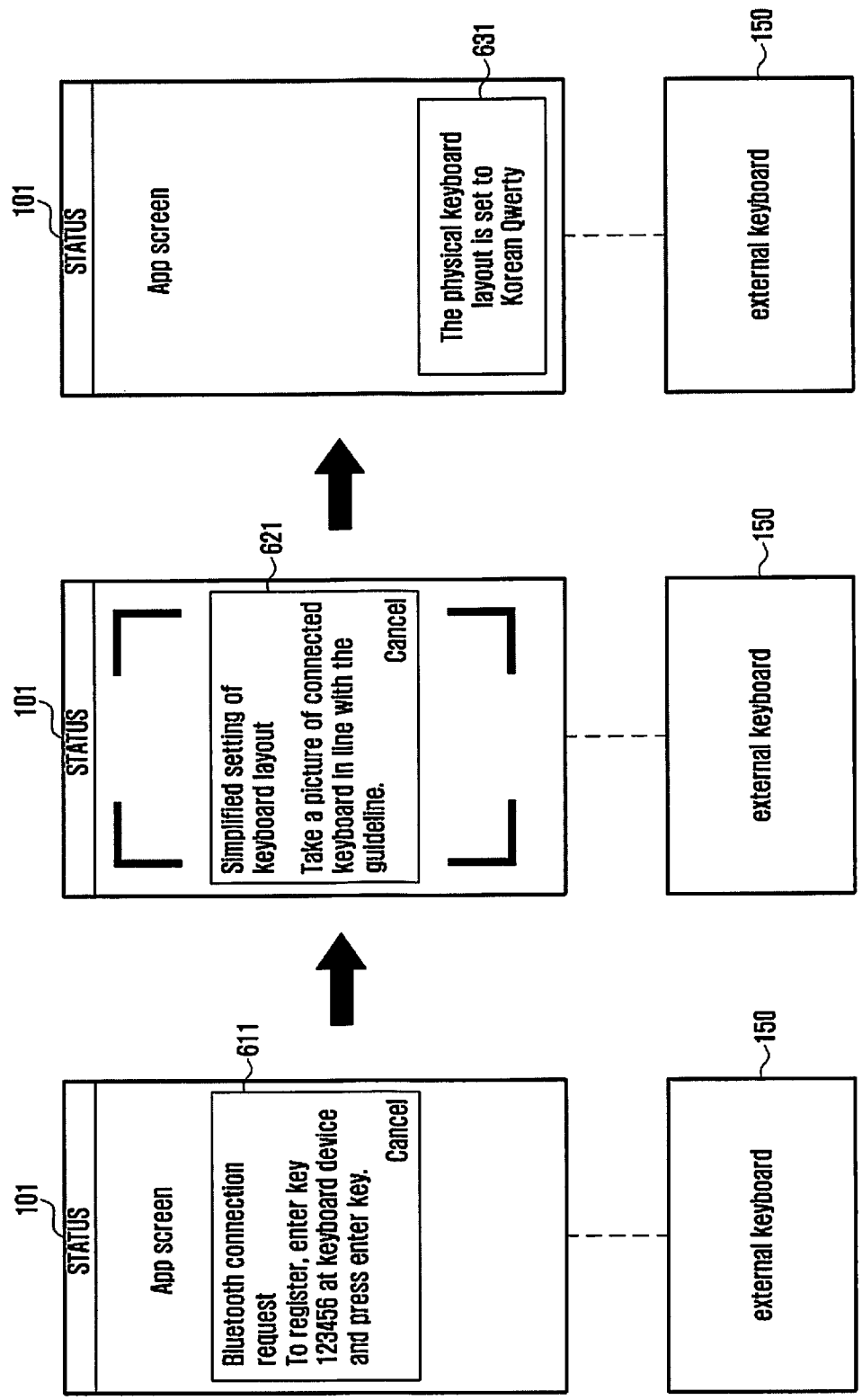

ELECTRONIC DEVICE AND KEY INPUT METHOD THEREFOR

CROSS-REFERENCE TO RELATED APPLICATION(S)

This application is based on and claims priority under 35 U.S.C. § 119 to Korean Patent Application No. 10-2018-0149474, filed on Nov. 28, 2018, in the Korean Intellectual Property Office, the disclosure of which is incorporated by reference herein in its entirety.

BACKGROUND

1. Field

The present disclosure relates generally to an electronic device and a method for inputting keys using an external input device.

2. Description of Related Art

The user of an electronic device such as a mobile terminal may input a key using a keyboard or keypad displayed on the display. However, due to a size limitation of the display of the electronic device, the user may experience inconvenience in key input. Hence, the user may connect an external input device (e.g., wired or wireless keyboard) to the electronic device and may input a key to the electronic device through the external input device.

When the user connects an external input device to the electronic device and inputs a key through the external input device, a case may arise where the character actually displayed on the electronic device according to the user's key input is different from the character engraved or printed on the external input device. For example, when the characters engraved on the external input device are of a first language (e.g., French), and the default language of the electronic device is set to a second language (e.g., English), if the user uses the external input device to input French characters, English characters will be displayed on the electronic device, which may confuse the user. To solve this, the user may have to directly select the language to be input. In addition, it may not be intuitive to know which key arrangement corresponds to the external input device connected to the electronic device among the displayed list of languages, which may cause a difficulty in selecting keys on the external input device.

SUMMARY

The present disclosure has been made to address the above-mentioned problems and disadvantages, and to provide at least the advantages described below.

In accordance with an aspect of the present disclosure, an electronic device is provided that includes a camera; a display; a communication interface; a memory; and a processor, wherein the processor may be configured to establish an electrical connection to an external keyboard; obtain an image of the external keyboard; set a key arrangement for the external keyboard based on the obtained image; and generate information corresponding to a key input signal received from the external keyboard based on the set key arrangement.

In accordance with another aspect of the present disclosure, a method for an electronic device is provided that includes establishing an electrical connection to an external keyboard; obtaining an image of the external keyboard; setting a key arrangement for the external keyboard based on the obtained image; and generating information corresponding to a key input signal received from the external keyboard based on the set key arrangement.

BRIEF DESCRIPTION OF THE DRAWINGS

The above and other aspects, features and advantages of certain embodiments of the present disclosure will be more apparent from the following description, taken in conjunction with the accompanying drawings, in which:

FIGS. 5A and 5B illustrate a list of key layouts for external keyboards available to the user of the electronic device, according to an embodiment;

FIG. 6 illustrates a process for connecting an external keyboard to the electronic device, obtaining an image of the external keyboard, and setting a key layout based on the obtained image, according to an embodiment;

DETAILED DESCRIPTION

Figure 1:
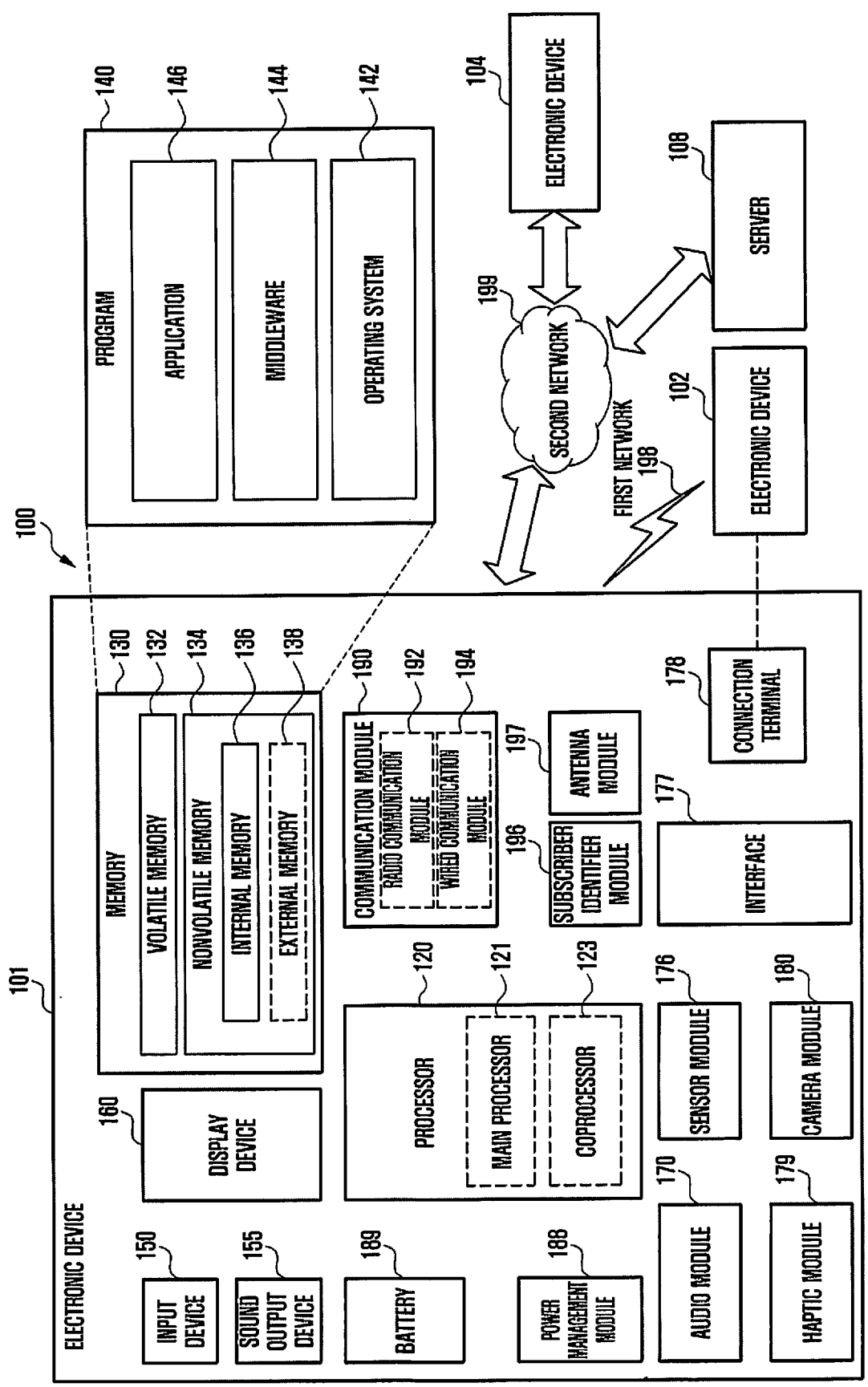
FIG. 1 is a block diagram of an electronic device in a network environment, according to various embodiments.

FIG. 1 is a block diagram illustrating an electronic device 101 in a network environment 100, according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of the operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
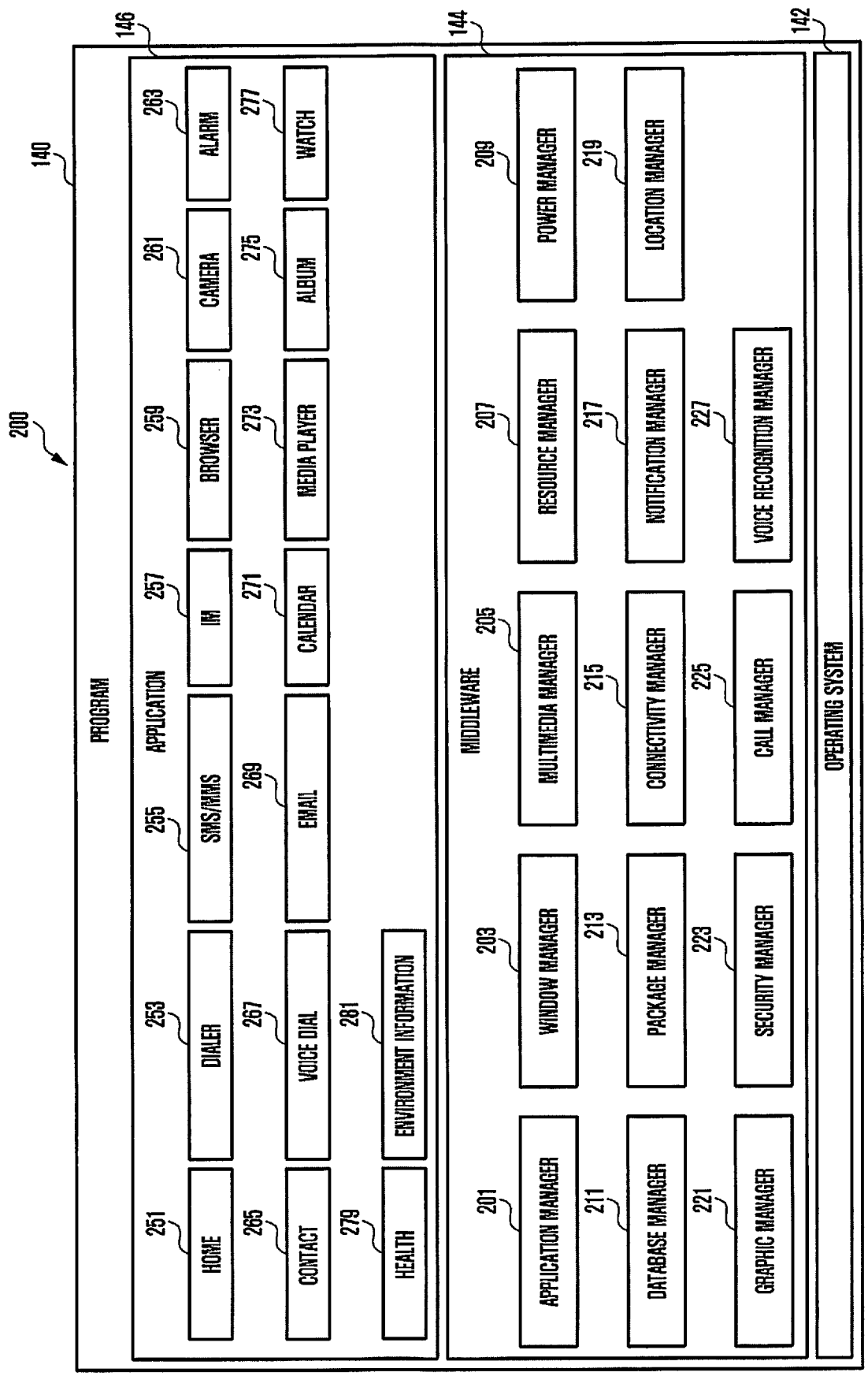
FIG. 2 illustrates a structure of programs, according to an embodiment.

FIG. 2 is a block diagram 200 illustrating the program 140, according to an embodiment.

The program 140 may include an operating system (OS) 142 to control one or more resources of the electronic device 101, middleware 144, or an application 146 executable on the OS 142. The OS 142 may include, for example, Android™, IOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application that is capable of supporting information exchange between the electronic device 101 and the external electronic device.

The information exchange application, for example, may include a notification relay application adapted to transfer designated information (e.g., a call, message, or alert) to the external electronic device or a device management application adapted to manage the external electronic device.

The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101. The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

The electronic device 101 according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
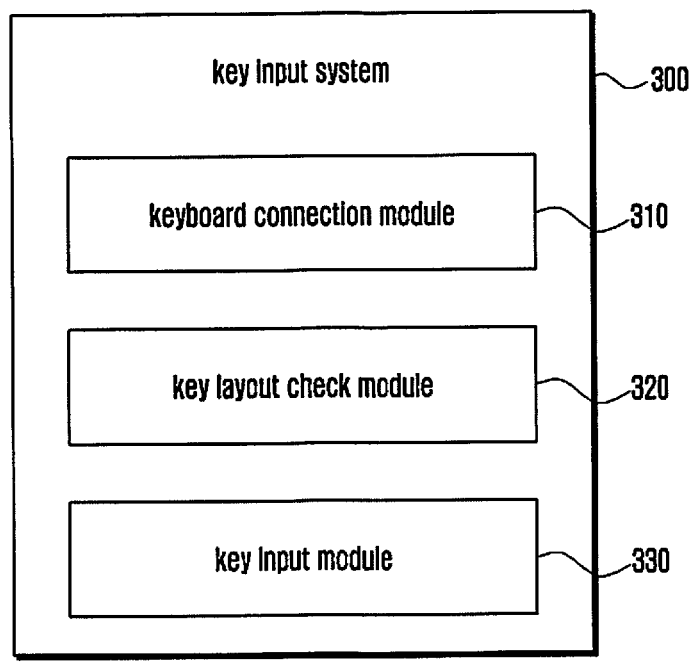
FIG. 3 is a schematic diagram of a key input system in the electronic device, according to an embodiment.

FIG. 3 is a schematic diagram of a key input system in the electronic device, according to an embodiment.

The electronic device 101 may include a key input system 300.

Referring to FIG. 3, the key input system 300 includes a keyboard connection module 310, a key layout check module 320, and a key input module 330. Here, the keyboard may be an external input device other than a soft keyboard or virtual keyboard displayed on the display device 160 of the electronic device 101. For example, the external input device may be referred to as an external keyboard or a physical keyboard.

The electronic device 101 may receive a key input signal from an external input device (e.g., keyboard) through the key input system 300, and output a key corresponding to the received key input signal. To output keys, the electronic device 101 may check the key layout (or key arrangement) of the external input device and output a key corresponding to the key input signal based on the key layout. For example, the key layout may indicate at least one of a position where a key is arranged or a character (e.g., language type, letter, number, or special symbol) engraved on the key.

The keyboard connection module 310 may wiredly or wirelessly connect the electronic device 101 and an external input device. For example, the electronic device 101 may make a connection to the external input device through the keyboard connection module 310 to receive a command or data to be used for an operation of the electronic device 101 from the external input device.

The key layout check module 320 may identify a key arrangement or key layout to map a key input signal received from the external input device. The electronic device 101 may receive a key input signal from the external input device and output a key corresponding to the key input signal based on the identified key layout. Hence, the key displayed on the electronic device 101 or an external device (e.g., monitor connected to the electronic device 101) may correspond to the result of conversion of the received key input signal performed by the electronic device 101 based on the identified key arrangement.

The key layout check module 320 may use an image of the external input device to identify the key arrangement of the external input device. For example, the key layout check module 320 may obtain an image of the external input device by using the camera module 180 of the electronic device 101. The key layout check module 320 may identify the key arrangement of the external input device based on the obtained image. For example, the key layout check module 320 may use an optical character reader (OCR) to identify the key arrangement formed by characters engraved on the external input device. Based on the obtained image, the key layout check module 320 may obtain information regarding the language (e.g., English, Chinese, Japanese, or Korean) and the keyboard type (e.g., QWERTY, Colmak, or Dvorak) supported by the external input device.

The key layout check module 320 may identify the key arrangement of the external input device by comparing information obtained from the image of the external input device with the key layout database stored in the memory 130 of the electronic device 101. If the memory 130 stores key arrangement data corresponding to the external input device from which an image is obtained, the key layout check module 320 may output a key corresponding to a key input signal based on the key arrangement data. If the memory 130 does not store key arrangement data corresponding to the external input device from which an image is obtained, the key layout check module 320 may notify the user that key arrangement data corresponding to the external input device is not found. In this case, the electronic device 101 may output a key corresponding to a key input signal based on the default language set in the electronic device 101, but there is a possibility of outputting a key that is unrelated to the connected external input device.

The key input module 330 may control display of a key corresponding to a key input signal received from the external input device on the display device 160 of the electronic device 101 or on an external electronic device 102 or 104. For example, the electronic device 101 may be connected to an external input device (e.g., keyboard) and may display a key corresponding to a key input signal received from the external input device on the display device 160. Additionally or alternatively, the electronic device 101 may be connected to an external input device and an external output device (e.g., monitor) and may display a key corresponding to a key input signal received from the external input device on the external output device.

The key input module 330 may display a key corresponding to the key input signal received from the external input device based on the key arrangement identified by the key layout check module 320. For example, a coordinate value received from the external input device may be mapped to a different key depending on the key arrangement. Even for the same coordinate value, as characters engraved in the external input device may be different, different keys may be input according to the reference key arrangement.

Figure 4:
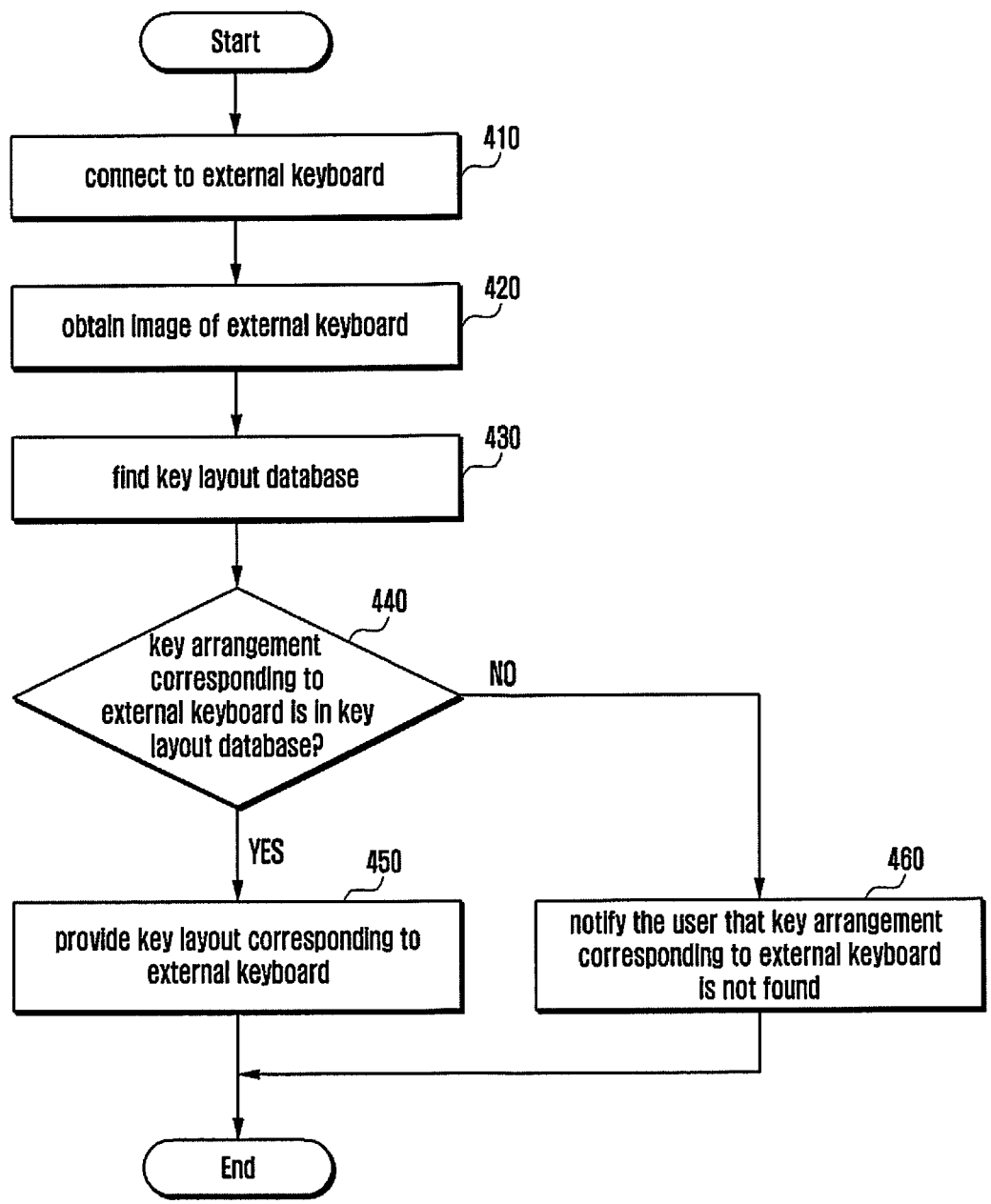
FIG. 4 is a flowchart of a method for obtaining an image of an external keyboard, identifying the key layout corresponding to the external keyboard, and providing the user with the identified key layout, according to an embodiment.

FIG. 4 is a flowchart of a method for obtaining an image of an external keyboard, identifying the key layout corresponding to the external keyboard, and providing the user with the identified key layout, according to an embodiment.

At step 410, the electronic device 101 is connected to an external keyboard. For example, the electronic device 101 may be wiredly or wirelessly connected to the external keyboard and receive a key input signal from the external keyboard.

At step 420, the electronic device 101 obtains an image of the external keyboard. For example, the electronic device 101 may activate the camera module 180 and acquire an image of the external keyboard by photographing the external keyboard through the camera module 180. The electronic device 101 may provide a user interface including a shooting guide and a notification for readily obtaining an image of the external keyboard.

At step 430, the electronic device 101 finds a key layout database. For example, the key layout database may be stored in the memory 130 of the electronic device 101 or in the server 108.

At step 440, the electronic device 101 determines whether a key arrangement (or keyboard layout) corresponding to the external keyboard is included in the key layout database based on the obtained image. If a key arrangement corresponding to the external keyboard is included in the key layout database, at step 450, the electronic device 101 provides the key layout corresponding to the external keyboard. In this way, the electronic device 101 can notify the user of the type of the external keyboard connected to the electronic device 101. Thereafter, in response to a key input signal received from the external keyboard, the electronic device 101 may display at least one piece of information corresponding to the key input signal by applying the key layout corresponding to the external keyboard.

Meanwhile, a case may arise where the obtained image of the external keyboard corresponds to a plurality of key layouts. For example, in the case of the same English QWERTY keyboard, one key layout may be used for entering English characters and another key layout may be used for entering Chinese characters (e.g., if you enter English characters as they are pronounced in Chinese, the corresponding Chinese character may be displayed (i.e., hao->好)). When the obtained image of the external keyboard corresponds to a plurality of key layouts in the key layout database, the electronic device 101 may provide a list of corresponding key layouts, and the user may select the key layout to be used from the list. Thereafter, the electronic device 101 may process a key input signal received from the external keyboard based on the selected key layout.

If a key arrangement corresponding to the external keyboard is not included in the key layout database, at step 460, the electronic device 101 notifies the user that the key arrangement corresponding to the external keyboard is not found. If a key arrangement corresponding to the external keyboard cannot be found, the electronic device 101 may analyze the cause and present a solution to the user. For example, if the image obtained through the camera module 180 is out of focus and it is difficult to recognize the characters engraved on the external keyboard, the electronic device 101 may provide the user with a tip (or guide) to newly obtain an image of the external keyboard. Additionally or alternatively, if the external keyboard the user wishes to use is not universal and is not included in the key layout database, the electronic device 101 may provide a notification for the user to check whether the key arrangement of the external keyboard can be obtained from an external electronic device (e.g., server).

Figure 5B:
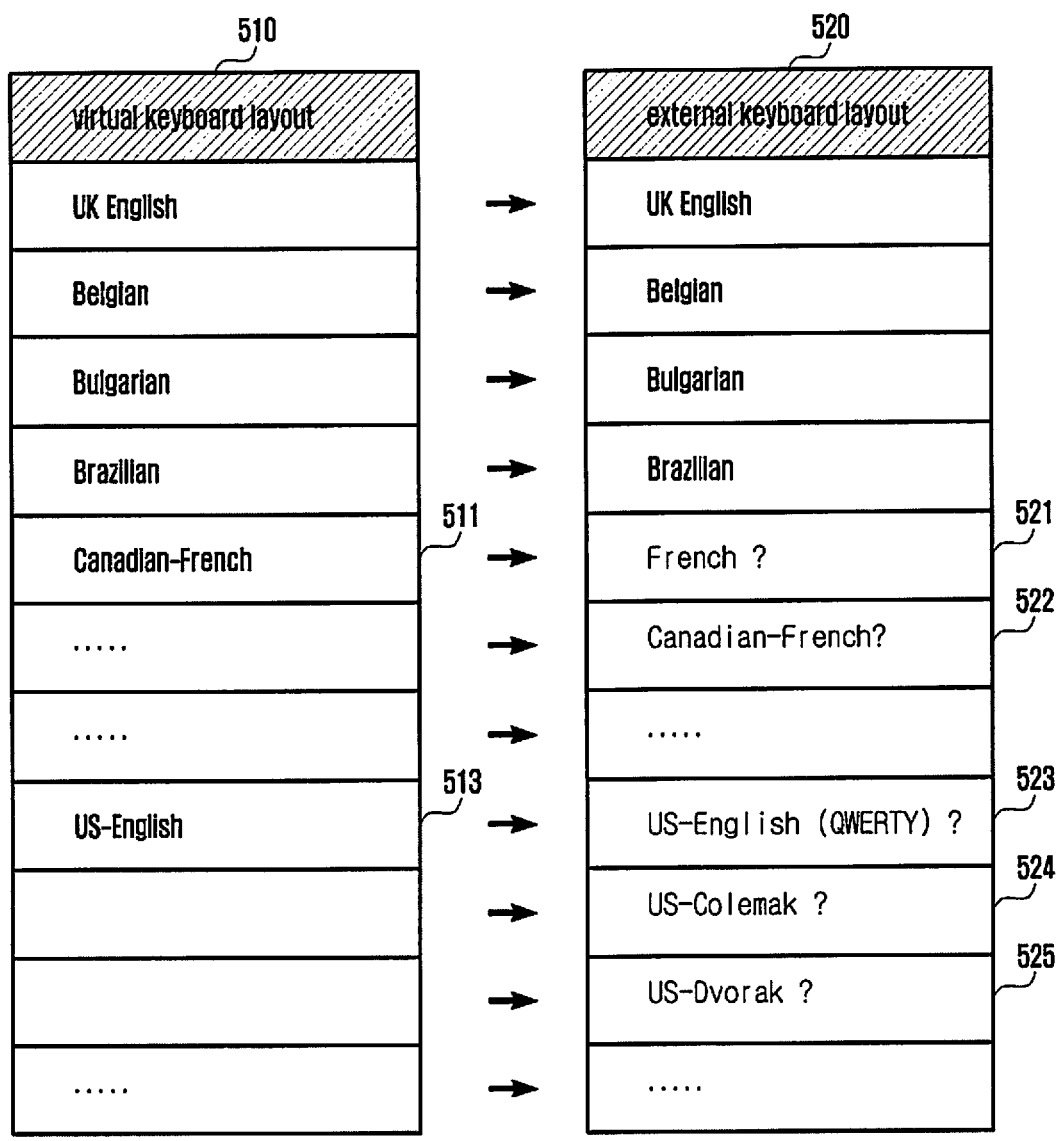

FIGS. 5A and 5B illustrate a list of key layouts for external keyboards available to the user of the electronic device, according to an embodiment.

With reference to FIG. 5A, the electronic device 101 may provide a list 500 of key layouts stored in the memory 130 so that the user can directly select a key arrangement for an external keyboard. For example, the user of the electronic device 101 may directly set the reference key arrangement when an external keyboard is connected instead of capturing an image of the external keyboard. The electronic device 101 may provide the key layout list 500 based on a key arrangement identified from an image of an external keyboard obtained by the camera module 180 and/or a key arrangement set directly by the user.

With reference to FIG. 5B, the electronic device 101 may provide a key layout list 520 based on the key arrangement 510 of a virtual or soft keyboard used by the user of the electronic device 101. For example, if the user of the electronic device 101 is using a key arrangement for Canadian French 511, the electronic device 101 may provide key arrangements for French 521 and Canadian French 522 as an element of the key layout list. Additionally or alternatively, if the user of the electronic device 101 is using a key arrangement for US-English 513, the electronic device 101 may provide key arrangements for QWERTY 523, Colemak 524, and Dvorak 525 as an element of the key layout list. However, the user may not have specific knowledge about the external keyboard and may have difficulty in identifying the key arrangement supported by the external keyboard that the user intends to use. In this case, it may be more convenient for the user if the electronic device 101 automatically sets the key arrangement based on an image of the external keyboard.

FIG. 6 illustrates a process for connecting an external keyboard to the electronic device, obtaining an image of the external keyboard, and setting a key layout based on the obtained image, according to an embodiment.

With reference to FIG. 6, the electronic device 101 is connected to an external keyboard 150. The electronic device 101 may be wirelessly connected to the external keyboard 150. In this case, the electronic device 101 may provide the user with a notification 611 for a smooth connection. The electronic device 101 may provide the notification 611 in the form of text, an image, an animation, and/or a video as an overlay on the execution screen (e.g., app screen) or a pop-up window. For example, the electronic device 101 may provide a notification that there is a Bluetooth connection request from the external keyboard 150. To register the external keyboard 150, the electronic device 101 may request the user to input keys "123456" from the external keyboard and then input an enter key.

The electronic device 101 can activate the camera module 180 to identify the key arrangement of the external keyboard 150. The electronic device 101 may provide a help item or a guide 621 to the user to obtain a clearer image of the external keyboard 150. The electronic device 101 may provide the guide 621 in the form of text, an image, an animation, and/or a video as an overlay on the execution screen (e.g., a preview screen according to activation of the camera module 180) or a pop-up window. For example, the electronic device 101 may provide a guide "simple keyboard layout settings" and may display a guide line for photographing the external keyboard 150. In addition, the electronic device 101 may request the user to photograph the external keyboard 150 in line with the guide line.

When the key arrangement of the external keyboard 150 is identified through the obtained image, the electronic device 101 may display a notification 631 indicating completion of key layout settings. The electronic device 101 may provide the notification 631 for key layout settings in the form of text, an image, an animation, and/or a video as an overlay on the execution screen (e.g., app screen) or a pop-up window. For example, the electronic device 101 may recognize that the key layout of the external keyboard 150 is Korean QWERTY based on the obtained image, and may output a phrase indicating that the key arrangement is Korean QWERTY.

Figure 7:
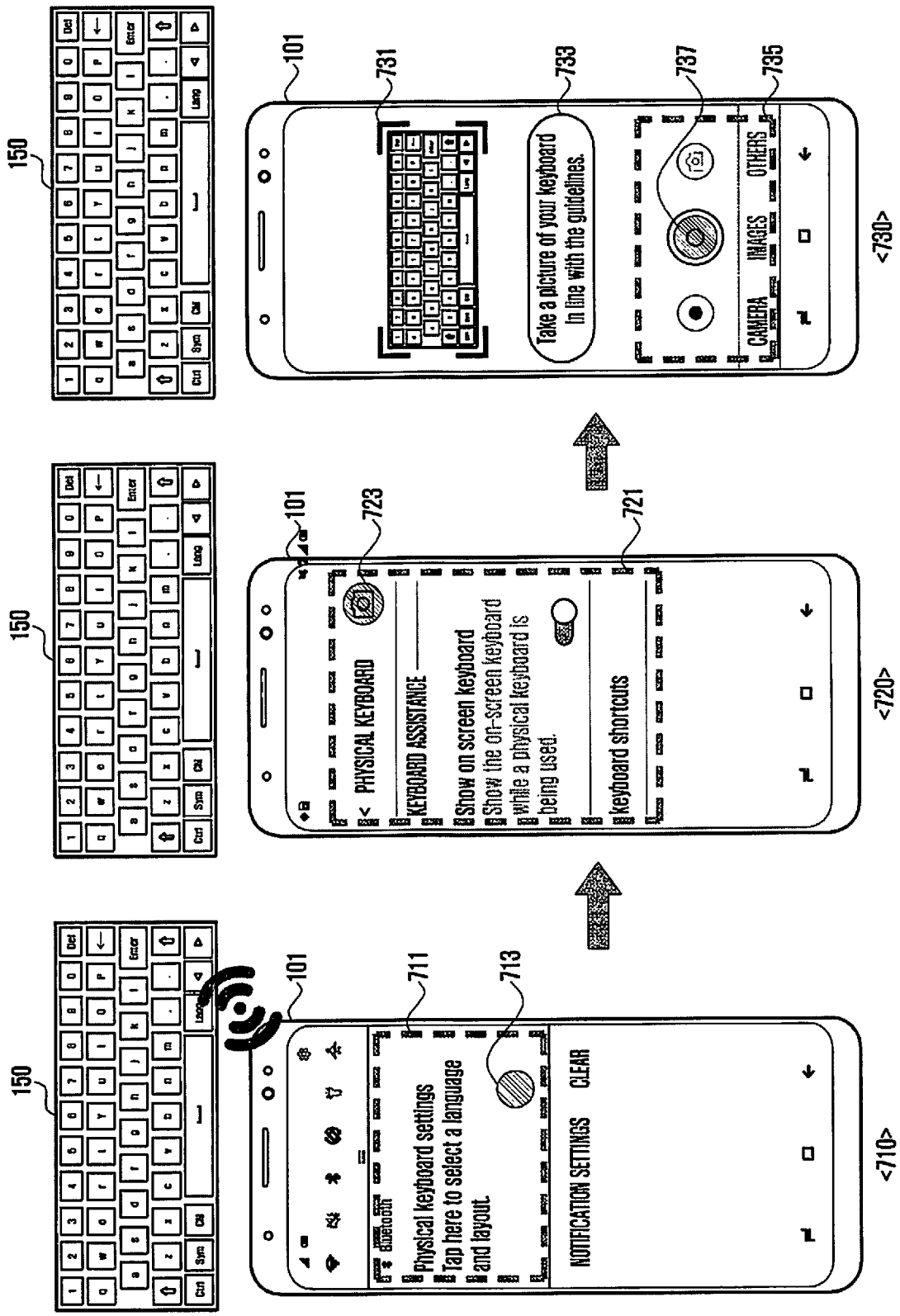
FIG. 7 depicts a first scheme for obtaining an image of the external keyboard and setting a key layout corresponding to the external keyboard, according to an embodiment.

FIG. 7 depicts a first scheme for obtaining an image of the external keyboard and setting a key layout corresponding to the external keyboard, according to an embodiment.

With reference to FIG. 7, the electronic device 101 is wirelessly connected to the external keyboard 150 as indicated by indicia 710. To connect to the external keyboard 150 in a designated manner (e.g., Bluetooth communication), the electronic device 101 may receive information about the external keyboard 150 (e.g., device identifier, keyboard type, and key arrangement) from the external keyboard 150. When connected to the external keyboard 150, the electronic device 101 may display a notification 711 for setting the language and key arrangement for the external keyboard 150. In response to a user input 713 for selecting the notification 711, the electronic device 101 may output a screen indicated by indicia 720.

The electronic device 101 may display a setting menu 721 regarding the external keyboard 150 as indicated by indicia 720. For example, the setting menu 721 may include a menu item (e.g., show on the screen keyboard) for specifying whether to display the external keyboard 150 in use on the display device 160 of the electronic device 101. Additionally or alternatively, the setting menu 721 may include a menu item (e.g., keyboards shortcuts) to enable the user to manually set the language and key arrangement for the external keyboard 150.

As indicated by indicia 720, the electronic device 101 may display a shooting item 723 on the setting menu 721 to set a key arrangement of the external keyboard 150 based on the image of the external keyboard 150. In response to a user input for selecting the shooting item 723, the electronic device 101 may output a screen indicated by indicia 730.

As indicated by indicia 730, the electronic device 101 may display a shooting guide line 731 and a help item 733 for easily capturing an image of the external keyboard 150. In addition, the electronic device 101 may provide a shooting interface 735 and may obtain an image of the external keyboard 150 in response to a user input for selecting the shooting button 737.

As indicated by indicia 730, the electronic device 101 may obtain an image of the external keyboard 150 by using a means other than selecting the shooting button 737. For example, the shooting interface 735 may include a plurality of tabs such as "camera", "images", and "others". When the user selects the camera tab, the electronic device 101 may identify the key arrangement of the external keyboard 150 based on an image directly photographed by the user. When the user selects the images tab, the electronic device 101 may identify the key arrangement of the external keyboard 150 based on an image previously stored in, for example, the gallery. When the user selects the others tab, the electronic device 101 may connect to an external electronic device (e.g., server) and retrieve a key arrangement corresponding to the external keyboard 150. In one embodiment, the electronic device 101 may connect to an external electronic device (e.g., server) and search for a key arrangement corresponding to the external keyboard 150 based on the information regarding the external keyboard 150 (e.g., device identifier).

Figure 8:
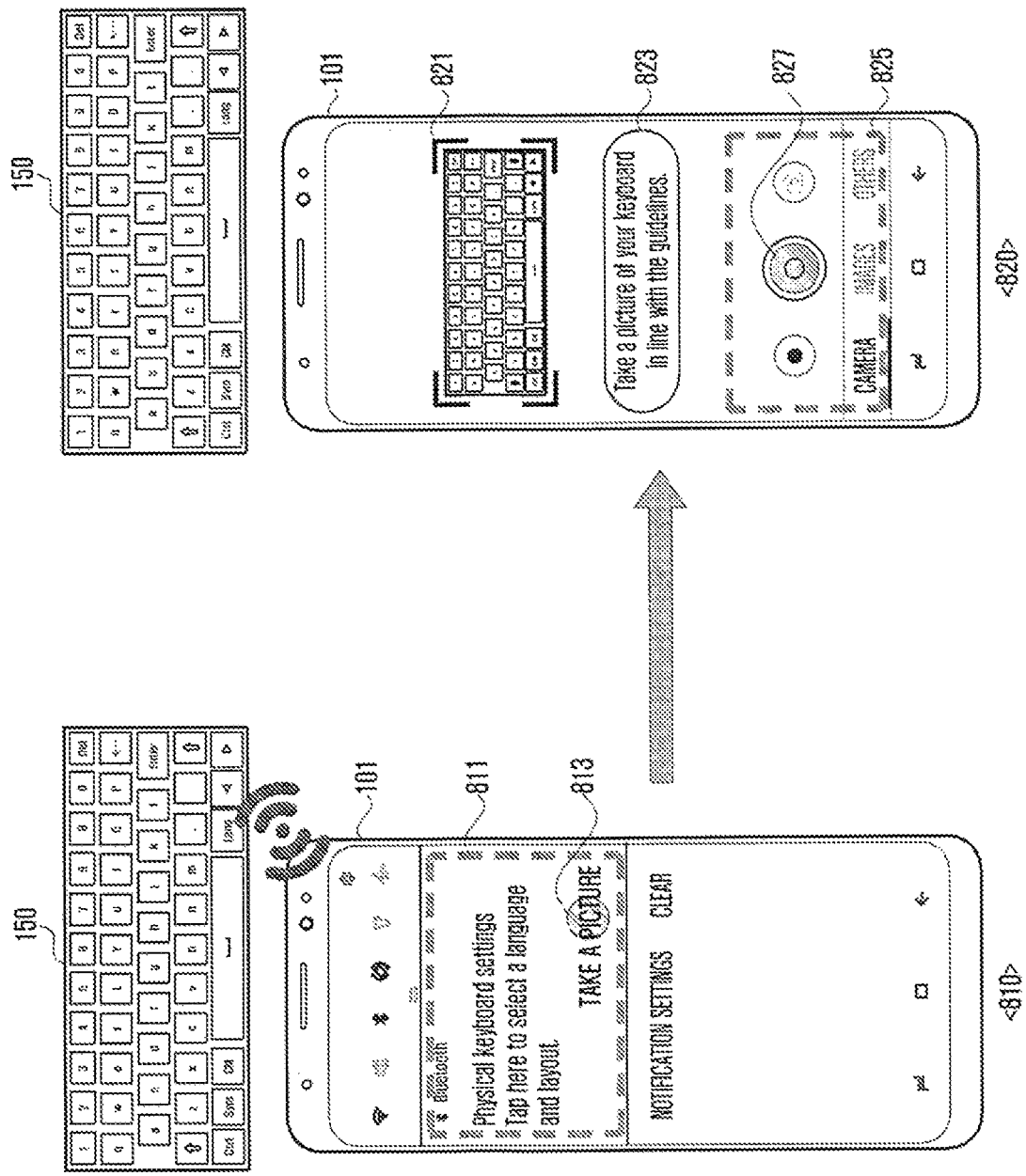
FIG. 8 depicts a scheme for obtaining an image of the external keyboard and setting a key layout corresponding to the external keyboard, according to an embodiment.

FIG. 8 depicts a scheme for obtaining an image of the external keyboard and setting a key layout corresponding to the external keyboard, according to an embodiment.

With reference to FIG. 8, the electronic device 101 is wirelessly connected to the external keyboard 150 as indicated by indicia 810. To connect to the external keyboard 150 in a designated manner (e.g., Bluetooth communication), the electronic device 101 may receive information about the external keyboard 150 (e.g., device identifier, keyboard type, and key arrangement) from the external keyboard 150. When connected to the external keyboard 150, the electronic device 101 may display a notification 811 for setting the language and key arrangement for the external keyboard 150. When the user selects the notification 811, the electronic device 101 may output a screen indicated by indicia 720 of FIG. 7.

As indicated by indicia 810, the electronic device 101 may display an item 813 (e.g., take a picture) for photographing the external keyboard 150 in the notification 811. That is, unlike the state indicated by indicia 710 of FIG. 7, the electronic device 101 may provide a shortcut item 813 for immediately photographing the external keyboard 150 at the initial notification 811. In this way, at least one step for setting the key arrangement of the external keyboard 150 can be reduced, so that the user can set the key arrangement in a more convenient manner.

As indicated by indicia 820, the electronic device 101 may display a shooting guide line 821 and a help item 823 for easily capturing an image of the external keyboard 150. In addition, the electronic device 101 may provide a shooting interface 825 and may obtain an image of the external keyboard 150 in response to a user input for selecting the shooting button 827.

As indicated by indicia 820, the electronic device 101 may obtain an image of the external keyboard 150 by using a means other than selecting the shooting button 827. For example, the shooting interface 825 may include a plurality of tabs such as "camera", "images", and "others". When the user selects the camera tab, the electronic device 101 may identify the key arrangement of the external keyboard 150 based on an image directly photographed by the user. When the user selects the images tab, the electronic device 101 may identify the key arrangement of the external keyboard 150 based on an image previously stored in, for example, the gallery. When the user selects the others tab, the electronic device 101 may connect to an external electronic device (e.g., server) and retrieve a key arrangement corresponding to the external keyboard 150. The electronic device 101 may connect to the external electronic device and search for a key arrangement corresponding to the external keyboard 150 based on the information regarding the external keyboard 150 (e.g., device identifier).

Figure 9:
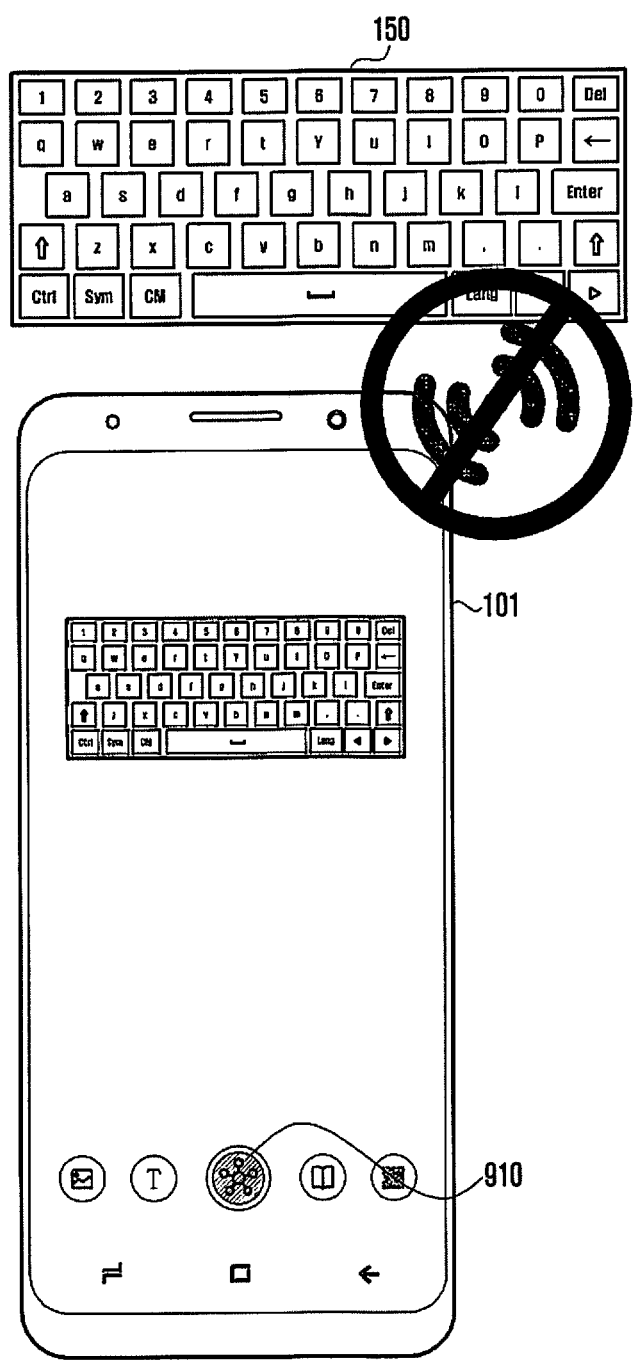
FIG. 9 depicts a scheme for obtaining an image of the external keyboard and setting a key layout corresponding to the external keyboard, according to an embodiment.
Figure 10A:
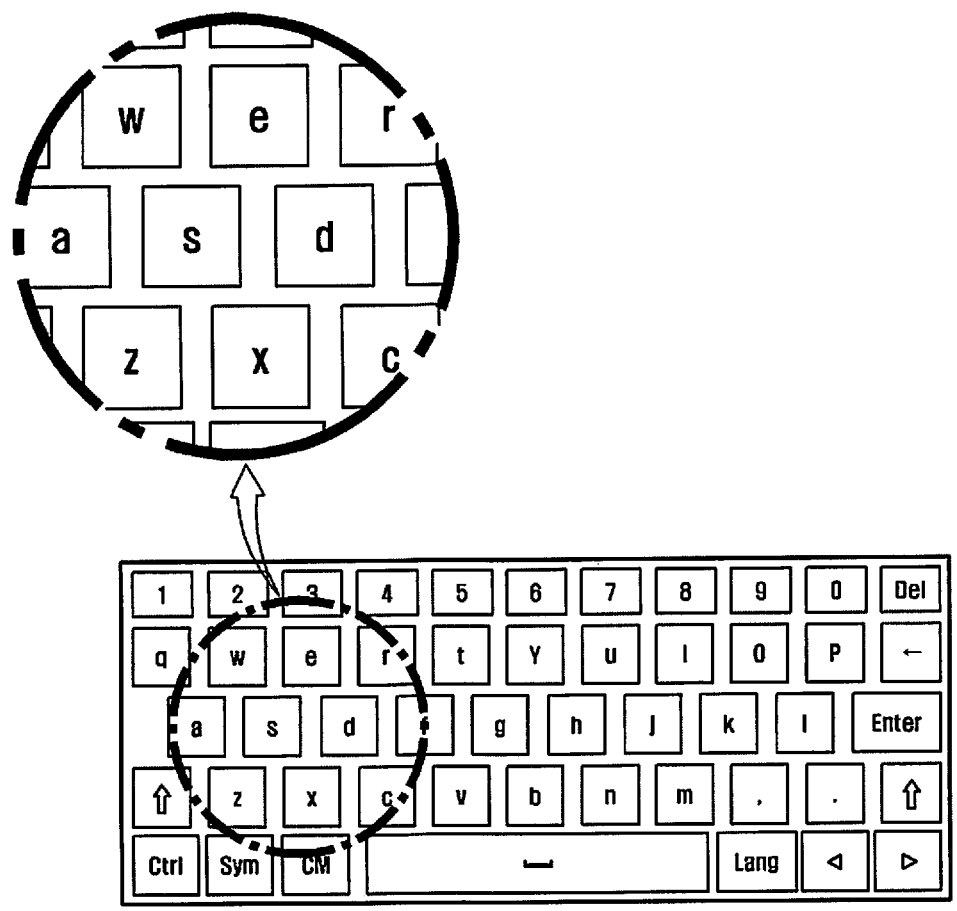
FIGS. 10A, 10B, 10C and 10D illustrate various key layouts of external keyboards, according to various embodiments.
Figure 10B:
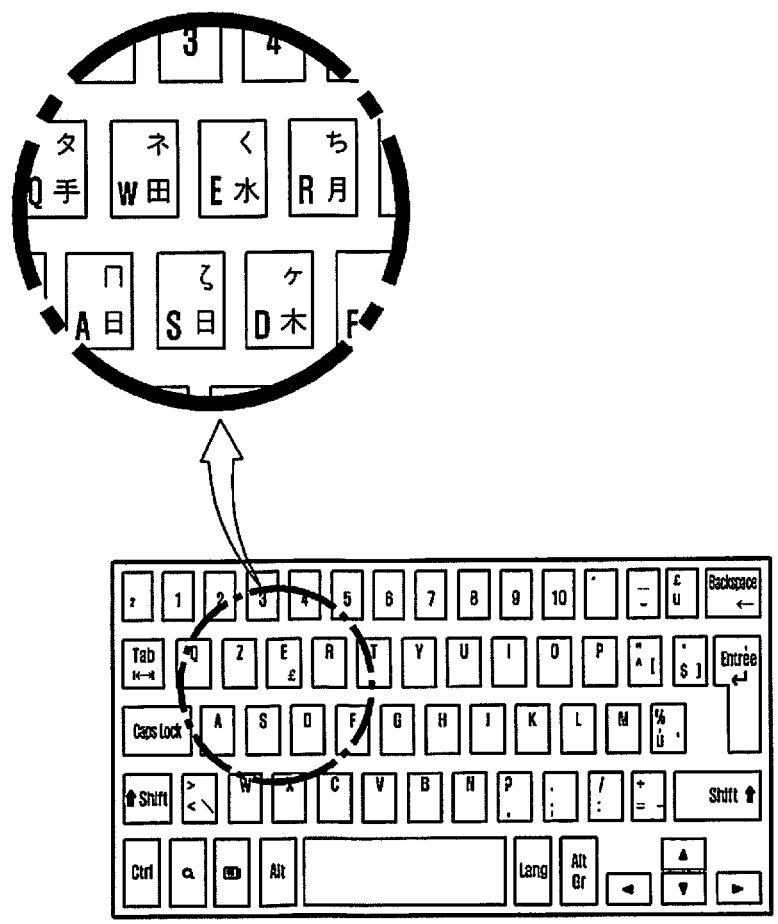
Figure 10C:
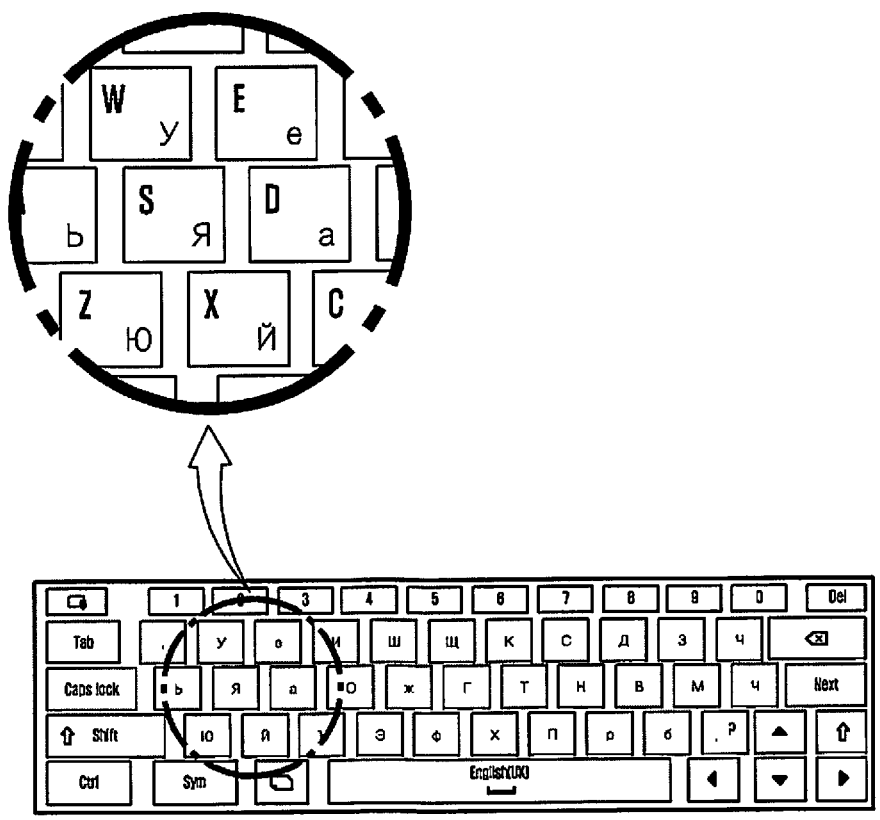
Figure 10D:
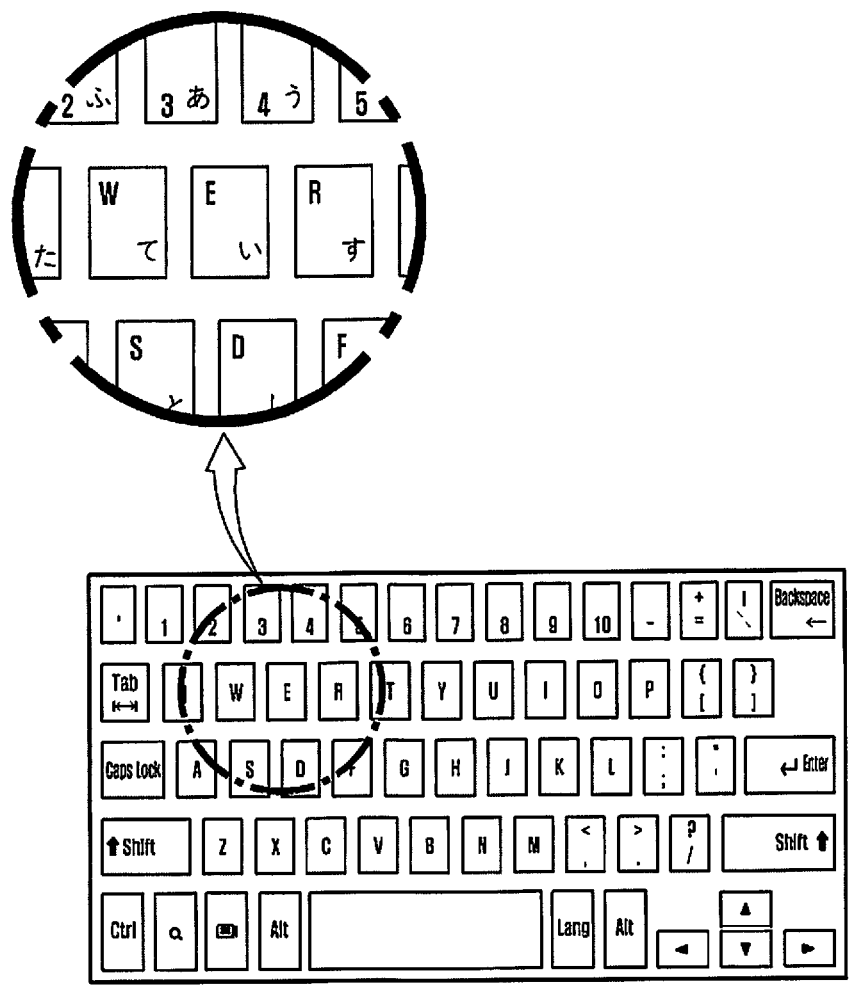

FIG. 9 depicts a scheme for obtaining an image of the external keyboard and setting a key layout corresponding to the external keyboard, according to an embodiment.

With reference to FIG. 9, when an image of the external keyboard 150 is obtained, the electronic device 101 can make a connection to the external keyboard 150 and obtain key layout information of the external keyboard 150. That is, unlike the embodiments of FIGS. 6 to 8 where the electronic device 101 makes a connection to the external keyboard 150 first and then identifies the key arrangement of the external keyboard 150 through the settings about the external keyboard 150, the electronic device 101 may connect to the external keyboard 150 and configure settings regarding the external keyboard 150 after obtaining an image of the external keyboard 150. For example, the electronic device 101 may obtain visual information about an object first and then perform at least one operation in relation to the object.

The electronic device 101 may perform a vision intelligence function before being connected to the external keyboard 150. When the user photographs the external keyboard 150, the electronic device 101 may activate the wireless communication module 192 to find the external keyboard 150 located around the electronic device 101. If the external keyboard 150 is found, the electronic device 101 may attempt to make a wireless connection to the external keyboard 150 and may set a key arrangement of the external keyboard 150 based on the obtained image of the external keyboard 150. The embodiment of FIG. 9 uses fewer steps than the embodiments of FIGS. 7 and 8, so that the user can more easily configure the external keyboard.

FIGS. 10A, 10B, 10C and 10D illustrate various key layouts of external keyboards, according to various embodiments.

FIGS. 10A, 10B, 10C and 10D illustrate various types of external keyboards. As there are many different types of external keyboards, it may be difficult for the user to correctly set the type of a specific external keyboard. Hence, according to various embodiments of the disclosure, it may be very convenient for the user to set the key arrangement of the external keyboard by using an image of the external keyboard obtained by the electronic device 101.

Figure 11:
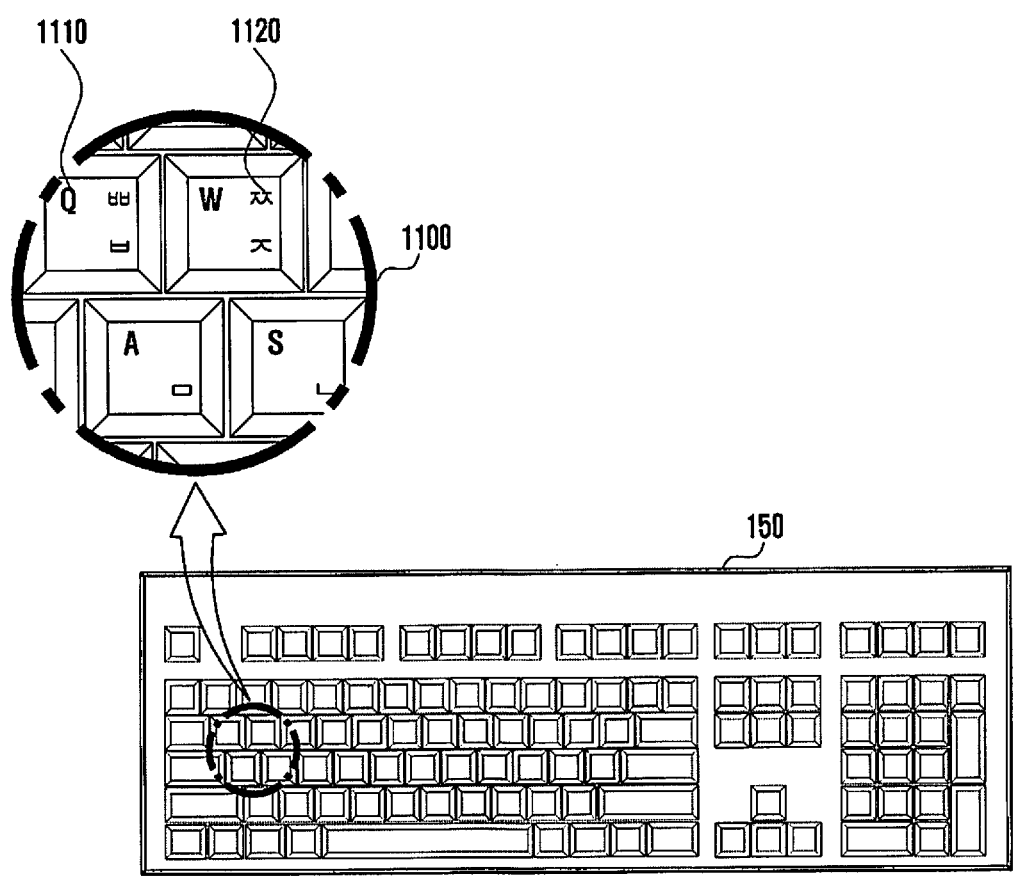
FIG. 11 illustrates a method of setting the key layout when at least two character sets of different languages are engraved on the external keyboard, according to an embodiment.

FIG. 11 illustrates a method of setting the key layout when at least two character sets of different languages are engraved on the external keyboard, according to an embodiment.

As shown in FIG. 11, different sets of characters respectively corresponding to different languages may be engraved on the external keyboard 150. For example, referring to the enlarged portion 1100 of the external keyboard 150, English characters may be engraved for the first language 1110 and Korean characters may be engraved for the second language 1120. As described above, when multiple character sets of different languages are engraved on the external keyboard 150, the electronic device 101 may determine the key arrangement to be used with reference to the soft keyboard settings of the electronic device 101.

If both the first language 1110 and the second language 1120 are set to be available on the soft keyboard, the electronic device 101 may configure settings so that both key arrangements for the first language 1110 and the second language 1120 are available. For example, as the external keyboard 150 may include a language selection key, the electronic device 101 may be configured to switch between the different key arrangements in response to pressing the language selection key. Additionally or alternatively, the electronic device 101 may provide an option to select a specific key arrangement from among different key arrangements respectively corresponding to different languages. The electronic device 101 may provide a list of key arrangements to the user, and may be configured to input keys by using a specific key arrangement selected by the user.

If only one of the first language 1110 and the second language 1120 is set in the soft keyboard, the electronic device 101 may be configured to use a specific language (e.g., either the first language 1110 or the second language 1120) set in the soft keyboard although a plurality of languages are identified through the image of the external keyboard 150.

If the plurality of languages identified through the image of the external keyboard 150 are different from those used in the soft keyboard, the electronic device 101 may be configured to use a language that matches the system language. If the plurality of languages do not match the system language, the electronic device 101 may be configured to use English by default.

According to an embodiment, the electronic device may include a camera; a display; a communication interface; a memory; and a processor 12, wherein the processor may be configured to electrically connect to an external keyboard; obtain an image of the connected external keyboard; set a key arrangement for the external keyboard based on the obtained image; and generate information corresponding to a key input signal received from the external keyboard based on the set key arrangement.

The processor may be configured to display the generated information on the display.

The processor may be configured to transmit the generated information through the communication interface to an external electronic device, which may display the received information.

The processor may be configured to output the image of the external keyboard on the display while the generated information is displayed on the external electronic device.

The processor may be configured to obtain an image of the external keyboard by using the camera.

The processor may be configured to: obtain key arrangement information of the external keyboard from the obtained image; check whether a key arrangement corresponding to the key arrangement information is stored in the memory; and set, if a key arrangement corresponding to the key arrangement information is stored in the memory, the stored key arrangement as a key arrangement for the external keyboard.

The processor may be configured to obtain key arrangement information of the external keyboard from the obtained image; check whether a key arrangement corresponding to the key arrangement information is stored in the memory; and set, if a key arrangement corresponding to the key arrangement information is not stored in the memory, a key arrangement corresponding to a system language of the electronic device as a key arrangement for the external keyboard.

The processor may be configured to obtain key arrangement information corresponding to a plurality of languages of the external keyboard from the obtained image; and set, among the plurality of languages, a key arrangement corresponding to a language that matches a language of the soft keyboard of the electronic device as a key arrangement for the external keyboard.

The processor may be configured to provide at least one of a guide line, a notification, or a help item for obtaining an image of the external keyboard.

The processor may be configured to obtain an image of the external keyboard before establishing a connection to the external keyboard; establish a connection to the external keyboard; and set a key arrangement corresponding to the external keyboard.

According to an embodiment, a method for an electronic device may include electrically connecting to an external keyboard; obtaining an image of the connected external keyboard; setting a key arrangement for the external keyboard based on the obtained image; and generating information corresponding to a key input signal received from the external keyboard based on the set key arrangement.

The method may include displaying the generated information on the display of the electronic device.

The method may include transmitting the generated information through a communication interface of the electronic device to an external electronic device, which may display the received information.

The method may include outputting the image of the external keyboard on the display of the electronic device while the generated information is displayed on the external electronic device.

The method may include obtaining an image of the external keyboard by using a camera of the electronic device.

The method may include obtaining key arrangement information of the external keyboard from the obtained image; checking whether a key arrangement corresponding to the key arrangement information is stored in the memory of the electronic device; and setting, if a key arrangement corresponding to the key arrangement information is stored in the memory, the stored key arrangement as a key arrangement for the external keyboard.

The method may include obtaining key arrangement information of the external keyboard from the obtained image; checking whether a key arrangement corresponding to the key arrangement information is stored in the memory of the electronic device; and setting, if a key arrangement corresponding to the key arrangement information is not stored in the memory, a key arrangement corresponding to the system language of the electronic device as a key arrangement for the external keyboard.

The method may include obtaining key arrangement information corresponding to a plurality of languages of the external keyboard from the obtained image; and setting, among the plurality of languages, a key arrangement corresponding to a language that matches a language of the soft keyboard of the electronic device as a key arrangement for the external keyboard.

The method may include providing at least one of a guide line, a notification, or a help item for obtaining an image of the external keyboard.

The method may include obtaining an image of the external keyboard before establishing a connection to the external keyboard; establishing a connection to the external keyboard; and setting a key arrangement corresponding to the external keyboard.

When the external input device is connected to the electronic device, the electronic device may obtain an image of the external input device. Based on the obtained image, the electronic device may identify a key layout corresponding to the external input device from a database stored in the electronic device. Upon receiving a key input signal from the external input device, the electronic device may output a key corresponding to the key input signal based on the identified key layout.

After obtaining an image of the external input device, the electronic device may connect to the external input device and identify the key layout of the external input device at the same time.

Accordingly, the user may easily input a key to the electronic device through the external input device without having to think about the key layout of the external input device.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
a camera;
a display;
a communication interface;
a memory; and
a processor operatively coupled with the camera, the display, the communication interface and the memory,
wherein the processor is configured to:
establish a wireless connection with an external keyboard;
obtain an image of the external keyboard by photographing the external keyboard through the camera;
obtain key arrangement information of the external keyboard from the obtained image;
determine whether a key arrangement corresponding to the key arrangement information is stored in the memory;
set, if a key arrangement corresponding to the key arrangement information is stored in the memory, the stored key arrangement as a key arrangement for the external keyboard;
set, if a key arrangement corresponding to the key arrangement information is not stored in the memory, a key arrangement corresponding to a system language of the electronic device as a key arrangement for the external keyboard; and
generate information corresponding to a key input signal based on the set key arrangement if the key input signal is received from the external keyboard.

2. The electronic device of claim 1, wherein the processor is further configured to:
display the generated information on the display; and
transmit the generated information through the communication interface to an external electronic device, and
wherein the external electronic device is configured to display the received information.

3. The electronic device of claim 2, wherein the processor is further configured to provide the image of the external keyboard on the display while the generated information is displayed on the external electronic device.

4. The electronic device of claim 1, wherein the processor is further configured to:
obtain key arrangement information corresponding to a plurality of languages of the external keyboard from the obtained image; and
set, among the plurality of languages, a key arrangement corresponding to a language that matches a language of a soft keyboard of the electronic device as a key arrangement for the external keyboard.

5. The electronic device of claim 1, wherein the processor is further configured to provide at least one of a guide line, a notification, or a help item for obtaining an image of the external keyboard.

6. The electronic device of claim 1, wherein the processor is further configured to:
obtain an image of the external keyboard before establishing the wireless connection to the external keyboard; and
establish the wireless connection to the external keyboard to set a key arrangement corresponding to the external keyboard.

7. A method for an electronic device, the method comprising:
- establishing a wireless connection with an external keyboard;
- obtaining an image of the external keyboard by photographing the external keyboard through a camera;
- obtaining key arrangement information of the external keyboard from the obtained image;
- determining whether a key arrangement corresponding to the key arrangement information is stored in a memory of the electronic device;
- setting, if a key arrangement corresponding to the key arrangement information is stored in the memory, the stored key arrangement as a key arrangement for the external keyboard;
- setting, if a key arrangement corresponding to the key arrangement information is not stored in the memory, a key arrangement corresponding to a system language of the electronic device as a key arrangement for the external keyboard; and
- generating information corresponding to a key input signal based on the set key arrangement if the key input signal is received from the external keyboard.

8. The method of claim 7, further comprising:
- displaying the generated information on a display of the electronic device; and
- transmitting the generated information through a communication interface of the electronic device to an external electronic device, and wherein the external electronic device is configured to display the received information.

9. The method of claim 8, further comprising providing the image of the external keyboard on a display of the electronic device while the generated information is displayed on the external electronic device.

10. The method of claim 7, further comprising:
- obtaining key arrangement information corresponding to a plurality of languages of the external keyboard from the obtained image; and
- setting, among the plurality of languages, a key arrangement corresponding to a language that matches a language of a soft keyboard of the electronic device as a key arrangement for the external keyboard.

11. The method of claim 7, further comprising providing at least one of a guide line, a notification, or a help item for obtaining an image of the external keyboard.

12. The method of claim 7, further comprising:
- obtaining an image of the external keyboard before establishing the wireless connection to the external keyboard; and
- establishing the wireless connection to the external keyboard to set a key arrangement corresponding to the external keyboard.

* * * * *